July 4, 1950     A. HAZELTINE     2,513,936
HIGH-VOLTAGE POWER SUPPLY SYSTEM
Filed July 1, 1946     2 Sheets-Sheet 2
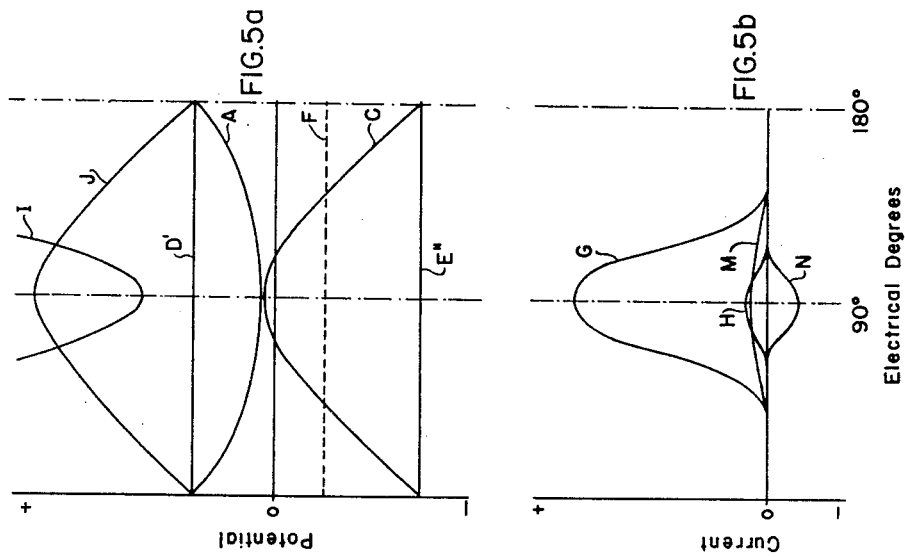
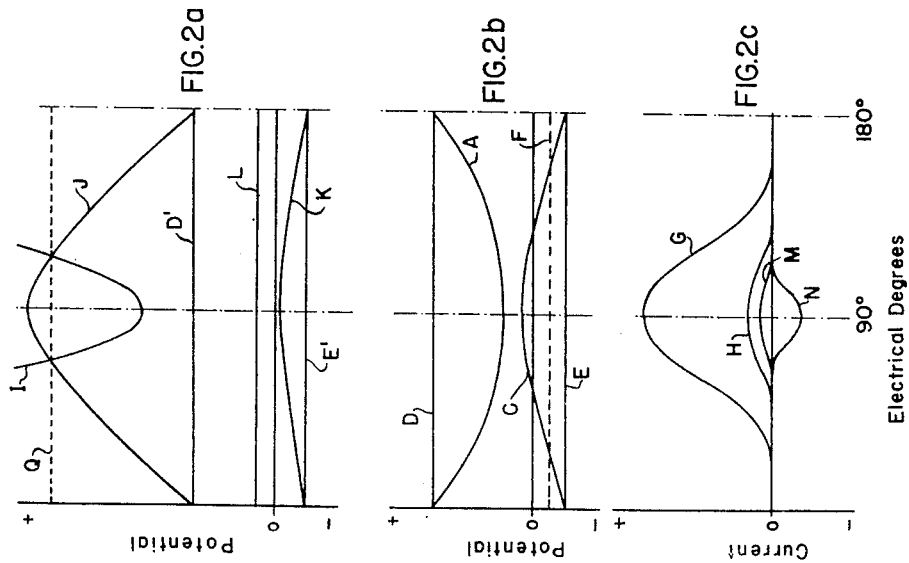
INVENTOR.
ALAN HAZELTINE
ATTORNEY Patented July 4, 1950

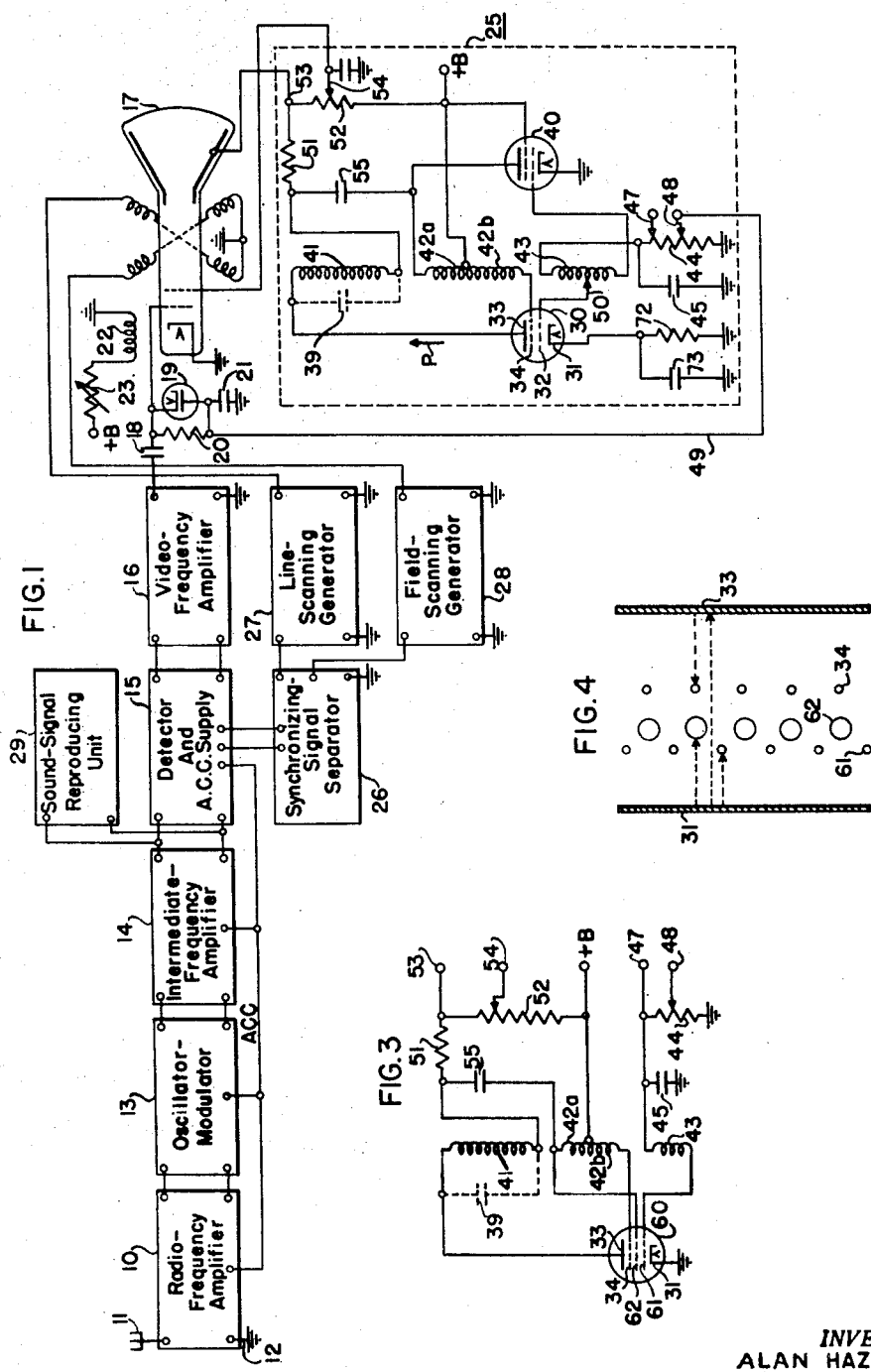

2,513,936

UNITED STATES PATENT OFFICE 2,513,936

HIGH-VOLTAGE POWER-SUPPLY SYSTEM

Alan Hazeltine, Maplewood, N. J., assignor to Hazeltine Research, Inc., Chicago, Ill., a corporation of Illinois Application July 1, 1946, Serial No. 680,793

11 Claims. (Cl. 321—32)

The present invention relates, in general, to high-voltage power-supply systems and is particularly directed to such systems for supplying a voltage of high magnitude and positive polarity with respect to a reference point, such as ground.

It is frequently necessary to supply relatively high unidirectional potentials of the order of several thousand volts to electrical apparatus, for example, cathode-ray tubes of television systems. The energizing sources generally available for exciting the power supply are of relatively low voltage of the order of a few hundred volts. Therefore, the energizing voltage must be stepped up many times before it is suited for application to such electrical apparatus.

It has heretofore been proposed to develop the requisite high voltages from commercial alternating current supply mains by utilizing a conventional high-voltage transformer and rectifier. A transformer operated at the usual power frequencies has a large iron core which makes it of appreciable physical size and involves an expensive core construction. Its winding are also comparatively large and the high-voltage insulation between windings is both elaborate and expensive. Such a power-supply system is further objectionable in that there must be associated therewith a filter for suppressing from the output voltage, the alternating-frequency component of the A. C. source. An effective filter for low- or power-frequency components includes condensers of high energy storage capacity which create a serious shock hazard and unduly restrict the application of the power supply in home installations.

Other power supplies of the prior art derive a high unidirectional voltage in a vacuum tube system, such as an oscillator, which generates an alternating potential of moderate amplitude but relatively high frequency for rectification in a well-known manner. This system, when employed to supply a unidirectional potential, which is positive with respect to ground, as required by a cathode-ray tube operated with its cathode at or near ground potential, is subject to one serious disadvantage. Due to the fact that the rectifier for rectifying the high-frequency alternating potential in the conventional system includes a cathode of the filamentary or indirectly heated type that is at a very high D. C. potential, its heater must be supplied with current from a transformer coil insulated from ground for the full direct voltage. It has been proposed that this objection be overcome through the use of high-frequency heating. However, high-frequency heating is difficult to control and puts an undesirable additional load on the high-frequency oscillator.

It is an object of the present invention, therefore, to provide a high-voltage power-supply system which avoids one or more of the aforementioned limitations of prior arrangements.

It is another object of the invention to provide an improved high-voltage power-supply system especially suited for supplying a unidirectional potential that is positive with respect to a reference point or ground.

It is a further object of the invention to provide such an improved high-voltage power-supply system wherein a desired unidirectional potential of a high order of magnitude is derived through the rectification of high-frequency oscillations.

It is a specific object of the invention to provide an improved high-voltage power-supply system wherein a high-voltage unidirectional potential is obtained by rectifying high-frequency oscillations in a rectifying system including electron-discharge means having a heated cathode maintained at approximately ground potential.

In accordance with the present invention, a high-voltage power-supply system comprises electron-discharge means including a first cathode for emitting primary electrons, an auxiliary cathode for emitting secondary electrons by secondary emission in response to electron bombardment from the first cathode, a collector electrode for collecting secondary electrons emitted by the auxiliary cathode, and a control electrode. The system also includes at least one output terminal therefor and alternating-potential-supply means coupled in series relation between the auxiliary cathode and the output terminal. The power-supply system further includes means coupled between the control electrode and the first cathode effective with the supply means to cause the primary electrons to flow from the first cathode to the auxiliary cathode only during intervals of low potential difference between the cathodes. The power-supply system additionally includes potential-supply means coupled between the collector electrode and the first cathode for applying to the collector electrode a potential more positive than that of the auxiliary cathode during operating intervals included within the intervals of primary electron flow, whereby the secondary electrons flow to the collector electrode from the auxiliary cathode and produce a high positive potential at the auxiliary cathode and the output terminal.

For a better understanding of the present invention, together with other and further objects thereof, reference is had to the following description taken in connection with the accompanying drawings, and its scope will be pointed out in the appended claims.

In the drawings, Fig. 1 is a schematic representation of a complete television receiving system embodying the invention in one form; Figs. 2a-2c, inclusive, comprise graphs utilized in explaining the operation of a portion of the receiver shown in Fig. 1; Fig. 3 is directed to a modification of the invention; Fig. 4 represents schematically the electrode structure of a tube suited to the arrangement of Fig. 3; while Figs. 5a and 5b include curves utilized in explaining the operation of the arrangement of Fig. 3.

Referring now more particularly to Fig. 1, the television carrier-wave signal receiver there represented is of the superheterodyne type and includes a radio-frequency amplifier 10 of any desired number of stages, having its input circuit connected to an antenna ground system 11, 12. Coupled in cascade with the output circuit of the radio-frequency amplifier 10, in the order named, are an oscillator-modulator 13, an intermediate-frequency amplifier 14 of one or more stages, a detector and automatic-contrast-control (A. C. C.) supply 15, a video-frequency amplifier 16 of one or more stages, and an image-reproducing device 17 of the cathode-ray tube type. The coupling between the input circuit of tube 17 and the output terminals of video-frequency amplifier 16 is provided by a condenser 18 and a conventional stabilizing diode rectifier 19 having a load resistor 20 and a by-pass condenser 21 coupled to its anode electrode. Conventional beam-deflecting windings are associated with the tube as well as a beam-focusing winding 22, energized from a source indicated +B through a variable resistor 23. For convenience, winding 22 has been shown apart from the cathode-ray tube although it usually is placed around the tube neck. A high-voltage power-supply system 25, to be described more particularly hereinafter, provides operating potentials for tube 17. There is also coupled to detector 15 a synchronizing-signal separator 26, having output circuits connected with a line-scanning generator 27 and a field-scanning generator 28. The output circuits of these generators, in turn, are connected with the beam-deflecting windings of tube 17. The output circuit of the A. C. C. supply included in unit 15 is connected to the input circuits of one or more of the tubes of radio-frequency amplifier 10, oscillator-modulator 13, and intermediate-frequency amplifier 14 in well-known manner.

A sound-signal reproducing unit 29 is also connected to the output circuit of intermediate-frequency amplifier 14. It may have stages of intermediate-frequency amplification, a sound-signal detector, stages of audio-frequency amplification, and a sound-reproducing device.

It will be understood that the various units thus far described, with the exception of the high-voltage power-supply system 25, may have any conventional construction and design. The details of such components are well known in the art rendering a further description thereof unnecessary.

Considering briefly the operation of the receiver as a whole and assuming for the moment that unit 25 is a conventional high-voltage power-supply system, a desired modulated carrier-wave television signal is intercepted by antenna system 11, 12. The signal is selected and amplified in radio-frequency amplifier 10 and applied to oscillator-modulator 13 wherein it is converted into an intermediate-frequency signal. The intermediate-frequency signal is selectively amplified in amplifier 14 and supplied to detector 15 where its modulation components are derived. These components, which comprise video-frequency as well as synchronizing-signal components, are amplified in video-frequency amplifier 16 and then stabilized in the stabilizing circuit, including diode 19. The stabilized signal is thereafter applied to the brilliancy-control electrode of cathode-ray tube 17 to modulate the intensity of the electron beam thereof in accordance with the video-frequency components. The synchronizing-signal components of the received signal are separated from the video-frequency components in the separator 26 and are used to synchronize the operation of the line-scanning and field-scanning generators 27 and 28, respectively. These generators supply scanning signals of saw-tooth wave form which are properly synchronized with reference to the received television signal and applied to the deflecting elements of cathode-ray tube 17, thereby to deflect the cathode-ray beam in two directions normal to each other to reproduce the received television image.

The automatic-contrast-control or A. C. C. signal derived in unit 15 is effective to control the amplification of one or more of units 10, 13, and 14 to maintain the signal input to detector 15 and to the sound-signal reproducing unit 29 within a relatively narrow range for a wide range of received signal intensities.

The sound-signal modulated-carrier wave accompanying the desired television modulated-carrier wave is concurrently intercepted by antenna system 11, 12. After selective amplification in radio-frequency amplifier 10, it is applied to oscillator-modulator 13 and converted to a sound-modulated intermediate-frequency signal. The sound-modulated intermediate-frequency signal is delivered to unit 29 wherein it is amplified and detected to derive the sound signal-modulation components which are further amplified and reproduced by the sound-reproducing device.

Referring now more particularly to the high-voltage power-supply system of the invention, indicated generally at 25, the system comprises electron-discharge means shown as a vacuum tube 30 of the tetrode type. Structurally, this tube is similar to the well-known beam power tube but with a modified electrode system. It includes the usual heated cathode 31 having a potential maintained within a range of relatively low values. Specifically, the cathode is grounded through a self-biasing resistor 72, by-passed for high-frequency currents by a condenser 73, so that, except for the value of the self-biasing potential, cathode 31 is maintained at ground potential. The electrode system further includes the usual control electrode 32 for controlling emission of primary electrons from cathode 31 to an auxiliary cathode 33 which is represented schematically in the manner of a conventional anode. However, the electrode 33 is comprised of or coated with an electron-emissive composition or otherwise treated to emit secondary electrons in response to electron bombardment from the cathode 31. Also, this auxiliary cathode is suitably spaced and insulated for high voltages which, as will appear presently, are applied thereto during the operation of the power-supply system. The fourth element 34 of the electrode system serves as a collector for collecting secondary electrons emitted by the auxiliary cathode 33. It is shielded from electron bombardment from cathode 31 by the control electrode 32 as in the ordinary beam power tube construction. This shielding is made more effective than usual by the potential applied to the control electrode which is more highly negative than in the ordinary beam power tube circuit application. The biasing arrangement for the control electrode will be discussed more fully hereinafter.

Power-supply system 25 further includes means for supplying high-frequency high-voltage oscillations, that is, high-frequency oscillations of relatively high amplitude. While any available source of oscillations, such as the heterodyning oscillator or line-scanning oscillator with power amplification, if required, may serve as this means, in the embodiment of Fig. 1, a separate class C oscillation generator is provided. It is of the Meissner type comprising a beam power tube 40 operated with a grounded cathode. A transformer, having three inductively coupled windings, is utilized for the feedback as well as the frequency-determining circuit of the oscillator. One winding is indicated 41 and is tuned by a condenser 39, shown in broken-line construction since it may be comprised, in whole or in part, of the distributed capacitance of the winding and the stray capacitances of the circuit to which it is coupled. The elements 39, 41 constitute the principal frequency-determining circuit of the oscillator. A first portion 42a of the second winding of the transformer is utilized as an anode inductor for tube 40 and also serves to connect the anode to a source of space current, indicated +B. The third transformer winding 43 is included in the control electrode or grid circuit and is inductively coupled to anode inductor 42a to provide a feed-back path from the output to the input circuits of tube 40 as required for the generation of oscillations. The grid circuit also includes the combination of a resistor 44 and a condenser 46 for deriving, by way of grid-circuit rectification, an operating bias such that the tube 40 operates in the class C mode wherein it exhibits high efficiency and produces a high-voltage output. The adjustable taps 47 and 48 associated with resistor 44 permit negative potentials to be derived from the oscillating system for use as bias potentials in the circuits of other tubes included in the receiver. For example, the tap 48 is connected by way of a conductor 49 to the brilliancy-control electrode of cathode-ray tube 17 to establish its operating bias. The described oscillation generator is coupled to the electrode system of tube 30 to permit a desired high-voltage unidirectional potential to be obtained by rectification of the high alternating voltage supplied by the oscillator. The interconnections of these tube circuits to constitute a peak rectifying system are as follows.

An adjustable tap 50 of transformer winding 43 is directly connected with control electrode 32 of tube 30 and comprises means for applying an alternating voltage from the oscillation generator to this electrode to effect electron emission from the first cathode 31 during spaced operating intervals occurring within alternative half cycles of the applied alternating potential. The winding portion 42b of the transformer comprises a circuit arrangement for applying a component of unidirectional potential, namely, the source +B, to collector electrode 34. It is also effective to apply a component of the alternating voltage generated in the oscillator to the collector electrode to maintain the potential thereof more positive relative to the first cathode 31 than would the source +B alone, during operating intervals in which that cathode emits primary electrons. One terminal of transformer winding 41 is directly connected to auxiliary cathode 33 and the turns of the several windings 41, 42 and 43 are proportioned so that the component of alternating voltage thus applied to the auxiliary cathode is very high relative to that applied to any of the remaining elements of the electrode system of tube 30. Also, the polarity of windings 41, 42 is such that the alternating voltage supplied to auxiliary cathode 33 is reversed in phase relative to that applied to the collector 34. Thus the winding 42b and the source +B comprise potential-supply means having parameters so selected as to maintain the collector electrode 34, at least during spaced operating intervals, at a potential positive relative to the first cathode 31 but low relative to the average potential of the auxiliary cathode 33. This will be explained in greater detail in connection with the operation of the power-supply system. The described circuit connections furnish a high alternating voltage between the auxiliary cathode 33 and the collector electrode 34 and constitute therewith a peak-rectifying system.

The circuit of the rectifying system is completed by a condenser 55, bridged between the output terminal of winding 41 and the opposite polarity terminal of winding 42. It also includes a filter resistor 51, which cooperates with the natural capacitance of the load, and a bleeder resistor 52 connected between the high-voltage direct current output terminal 53 of the system and the source +B. An adjustable tap 54 of the bleeder resistor provides a second direct current output terminal. The unidirectional output potentials available at terminals 53, 54 are substantially free from alternating current components of the operating frequency of the oscillation generator by virtue of a neutralizing feature. Neutralization is accomplished by selecting the condenser 55 to have a capacitance, the ratio of which to the natural capacitance of the upper terminal of winding 41 to ground is equal to the voltage ratio of the winding 41 to winding portion 42a. Where this relationship is established, substantially no alternating current having the frequency of the oscillating system appears at output terminals 53, 54. In coupling the power-supply system 25 to the cathode-ray tube, output terminal 53 is directly connected to the second anode, while tap 54 is by-passed to ground and coupled to the first anode.

The operation of the power-supply system may be readily understood by reference to the curves of Figs. 2a–2c, inclusive which represent the variations with time of certain potentials and currents at critical points in the system. The time axis is shown in electrical degrees for only the half cycle within which the oscillator experiences plate current. The curves of Fig. 2b are those of a conventional class C oscillator and include curve A which represents the anode potential of tube 40. Curve C shows the potential variations of the grid or control electrode; horizontal line D designates the constant anode supply voltage; horizontal line E indicates the constant grid bias developed by peak rectification in the grid circuit; and the broken-line F denotes the cutoff potential of tube 40 determined by the screen potential which here is the same as the anode-voltage supply +B.

During operating intervals in which the grid voltage (curve C) exceeds, in a positive direction, the cutoff voltage (line F), anode current flows in the oscillatory circuit, as indicated by curve G of Fig. 2c. In the course of each conductive cycle of tube 40 the grid potential (curve C) becomes positive and grid current flows, as indicated by the curve H of Fig. 2c. It is this flow of grid current which gives rise to the bias potential (line E) developed in the parallel combination of resistor 44 and condenser 45. The generation of high-voltage high-frequency oscillations in the circuits of tube 40 reflects potential variations in the circuits associated with the electrode system of tube 30, causing rectification of the generated oscillations to derive the desired high-voltage unidirectional potential. The rectification occurs only during operating intervals wherein particular potential relations are established, as will be apparent from a consideration of the curves of Fig. 2a.

In this figure, curve I represents the potential of auxiliary cathode 33 during a portion of the conductive cycle of oscillator tube 40. The resonant circuit 39, 41 coupled to the auxiliary cathode causes its potential to vary sinusoidally in accordance with the generated oscillations but about a direct current axis having a value equal to the high voltage unidirectional potential established at output terminal 53. The illustrated portion of curve I shows the maximum swing in the negative direction of the auxiliary-cathode potential, occasioned by the high-voltage oscillations applied thereto from the oscillation generator. The potential of the collector electrode 34 is determined by a direct current component, having the value approximately equal to +B as represented by horizontal line D', and a superposed alternating current potential, represented by curve J, applied to this electrode through winding portion 42b. For the duration of the operating interval under consideration, the potential of the collector electrode increases in a positive direction while the potential of the auxiliary cathode 33 undergoes its maximum excursion in the negative direction. The control electrode 32 receives a bias voltage of fixed value, indicated by horizontal line E', from the biasing circuit 44, 45. It also receives an alternating current component from the feed-back winding 43 in phase with that of the collector electrode, causing the net potential of the control electrode to vary in the manner of curve K throughout the interval in question. The self-biasing arrangement of tube 30 establishes the potential of cathode 31 at an approximately fixed value, shown by horizontal line L. Thus, it is seen that the potentials of control electrode 32, auxiliary cathode 33, and collector electrode 34 vary under the control of the generated oscillations.

When the potentials of control electrode 32 and collector electrode 34 rise sufficiently to overcome the combined bias delivered from elements 44, 45 and elements 72, 73, tube 30 is rendered conductive, that is, the first cathode 31 emits primary electrons which flow to the auxiliary cathode 33. This electron flow gives rise to what may be termed the primary current of tube 30, represented by curve M of Fig. 2c. In operating intervals in which the potential of auxiliary cathode 33 is positive relative to the first cathode 31 but less positive than the collector electrode 34, the secondary electrons emitted by the auxiliary cathode in response to the electron bombardment from the first cathode give rise to secondary electron current flowing to the collector. This secondary electron current is indicated by curve N of Fig. 2c. For this condition, the net current from the auxiliary cathode is designated in Fig. 1 by the arrow P and has a value equal to the difference in the instantaneous values of the secondary and primary currents. This net current flow from the auxiliary cathode represents rectification in the rectifying system which includes element 33 as a rectifier cathode, element 34 as a rectifier anode, windings 41, 42 as a source of alternating potential, condenser 55 and resistors 51, 52 as a load in series relation with the A. C. source. The rectification is of the combined alternating current potential established between the elements of the rectifier through the oscillations present in windings 41 and 42a. It is this rectification which establishes at the output terminals 53, 54 a high-voltage unidirectional potential.

The presence of condenser 55 in the rectifying system produces peak rectification, that is, rectification may take place only when a charge established on this condenser during a previous rectifying cycle has leaked off sufficiently to permit a voltage swing of the auxiliary cathode 33 which renders this cathode less positive than the collector electrode. This phenomenon is essentially the same as that of a conventional peak-rectifying system.

By way of summary, the oscillations generated in the circuit of tube 40 and applied to the control electrode of tube 30 permit the first cathode 31 to emit primary electrons during spaced operating intervals which occur within positive half cycles of the generated oscillations. Consequently, these spaced operating intervals occur at the frequency of the generated oscillations and, during each such interval, an operating condition is established in which the potential of the auxiliary cathode 33, while being positive relative to cathode 31, is less positive than the collector electrode 34. The establishment of such operating conditions enables the bombardment of the auxiliary cathode by the primary electrons to issue secondary electrons and effect rectification of the high-voltage oscillations applied to the rectifying elements constituted by auxiliary cathode 33 and collector electrode 34. This rectification produces the desired high-voltage unidirectional potential for application to cathode-ray tube 17.

In the normal operation of the power-supply system 25, the secondary current resulting from secondary emission is limited by space charge at the auxiliary cathode 33, just as ordinarily occurs in heated cathodes. In other words, primary current corresponding to electron emission from the first cathode 31 is regulated to be sufficient to produce an excess of secondary electrons some of which return to their source, the rectifier cathode or electrode element 33. Preferably, the duration of the primary current exceeds only slightly the duration of the secondary current as indicated by the relation of curves M and N in Fig. 2c. Under these conditions, an increase in the load applied to the high-potential system immediately lowers the output potential, permitting a greater swing in the negative direction of curve I, the potential of the auxiliary cathode 33. This increases the maximum potential difference between the collector electrode and the auxiliary cathode to produce an increased amount of secondary current and also to increase the time in which the secondary current may be produced. Both such effects increase the average value of current in the rectifying system and enable the additional load to be accommodated with only a relatively small drop in output voltage, since this voltage in the described arrangement is very large in comparison with the potential difference between collector electrode 34 and auxiliary cathode 33. In other words, the power-supply system exhibits a self-regulating characteristic which is highly desirable. Another particularly valuable feature resides in the fact that the heater circuit for the first cathode 31 requires no unusual design because it is maintained at approximately ground potential. Furthermore, the rectification of high-frequency oscillations in developing the unidirectional potential permits the use of low-energy-storage condensers for filtering and minimizes shock hazards.

With the specific arrangement of Fig. 1, the alternating voltage component applied to control electrode 32 is in phase with that applied to collector electrode 34. This results in a rapid rise in rectifier current from its cutoff condition. If desired, the control electrode 32 may be connected to the junction of inductor 43 and resistor 44, providing substantially only a direct current bias potential. In other installations, control electrode 32 may be connected to the high-potential terminal of transformer winding 43, increasing the magnitude of alternating current component applied thereto. This is especially the case when the +B supply is so high that the coil portion 42b may be omitted and the collector electrode 34 connected only to the source +B. For example, where the value of source +B corresponds with that indicated by broken-line Q of Fig. 2a, it is not necessary to apply the alternating current component to the collector electrode. Under this condition, therefore, the source +B comprises a potential-supply means coupled to the tube 30 and having at least one parameter so selected as to maintain the collector electrode 34, at least during the spaced operating intervals, at a potential which is positive relative to the first cathode 31 but which is low relative to the average potential of the auxiliary cathode 33.

In any case, to secure a high output voltage of high efficiency, the potential of the auxiliary cathode 33 and therefore that of the collector electrode 34, during spaced operating intervals, are made low relative to the average potential of the auxiliary cathode, as represented in Fig. 2a, where curve I representing the potential of the auxiliary cathode extends upward far beyond the range of the figure and has a corresponding high value.

From the foregoing description and explanation of the operation of the power-supply system, it will be apparent that the tuned circuit 39, 41 comprises an alternating-potential-supply means coupled in series relation between the auxiliary cathode 33 of tube 30 and the output terminal 53 of the system. It will also be clear that the resistor-condenser network 44, 45 and at least a portion of the winding 43 comprise means coupled between the control electrode 32 and the first cathode 31 of tube 30 which is effective with the aforesaid supply means comprising elements 39, 41 to cause primary electrons to flow from the first cathode to the auxiliary cathode 33 only during intervals of low potential difference between the cathodes. It will also be apparent that the source of unidirectional potential +B and the winding 42b comprise potential-supply means coupled between the collector electrode 34 and the cathode 31 of tube 30 through the space-current path of tube 40 for applying to the collector electrode 34 a potential more positive than that of the aforesaid auxiliary cathode during operating intervals included within the intervals of primary electron flow, whereby the secondary electrons flow to the collector electrode from the auxiliary cathode and produce a high positive potential at the auxiliary cathode and hence at the output terminal 53.

The modification of the power-supply system represented schematically in Fig. 3 is the equivalent in function of that of Fig. 1 but utilizes a single vacuum tube 60. This tube includes the first cathode 31 as an emitter of primary electrons and a pair of electrodes 61, 62 positioned in the electron path of the tube in the immediate vicinity of the cathode 31. Of these, electrode 61 serves as the control electrode or grid of the oscillatory system and electrode 62 is utilized as the oscillator anode. The transformer windings, indicated in the same manner as that employed in Fig. 1, are associated with these electrodes and constitute a Meissner oscillation generator arranged for class C operation. The collector electrode 34 and the auxiliary cathode 33 are aligned in the recited order in the electron path of tube 60.

A suitable structural arrangement for tube 60 is indicated in Fig. 4, wherein the electrode elements have the same reference characters as in the schematic diagram of Fig. 3. For the sake of simplicity, the electrodes are shown as of the planar type but in the usual case they are approximately cylindrical and have a concentric arrangement. The turns of electrode 62 are aligned with those of the collector 34 and serve to shield the latter from direct bombardment by the first cathode 31. The electrode 62 is fabricated from relatively coarse wire and its turns are spaced midway between those of the control electrode 61 in the longitudinal direction and are further away from the cathode by a distance smaller than the winding pitch. This arrangement lowers the resistance of the electron path to electrode 62 so as to increase the output and efficiency of the oscillator while lowering the temperature of the screen grid. Additionally, it impedes the passage of primary electrons to auxiliary cathode 33 sufficiently so that the primary electron current does not greatly exceed that required to produce a given amount of secondary electron current, namely, that needed to carry a particular load. The broken-line paths of Fig. 4 represent electron paths giving rise to grid current, screen current, primary current, and secondary current. This structural arrangement is unlike that of the conventional beam power tube where the control grid turns shield the screen grid since the windings of each grid are aligned in the usual beam power tube.

The circuit arrangement connected with the electrode system of tube 60 is generally similar to that of Fig. 1 and corresponding components are identified by the same reference characters. However, no cathode bias is provided since the primary cathode 31 is directly grounded. For this reason, the grid bias established by resistor 44 and condenser 45 is higher than in the arrangement of Fig. 1. The increased bias is realized by including an increased number of turns in the transformer winding 43.

The operation of the modification represented by Fig. 3 is shown by the curves included in Figs. 5a and 5b. The curves of these figures are similar to those of Figs. 2a—2c, inclusive, corresponding ones being identified by the same reference characters. It will be noted, however, that curve A of Fig. 5a, showing the anode potential variation of the oscillatory system, denotes the potential variation of electrode 62 of tube 60. Also, curve C represents the potential variation of the control electrode 61 which controls the oscillatory system as well as the rectifying system. The only significant difference in the operation of the Fig. 3 arrangement over that of Fig. 1 concerns the duration of the flow of primary current in tube 60. As shown by curve M in Fig. 5b, the primary current inherently has the same duration as the current flow to the oscillator anode 62 and may be chosen as a compromise between a long duration, desirable for high oscillator output, and a short duration which minimizes the primary current with respect to the duration of the secondary current. The primary current subtracts from the useful output current of the rectifying system and, therefore, should be minimized.

The operation of the Fig. 1 and Fig. 3 arrangements set forth above neglects the starting conditions and assumes the systems to be functioning. Either may be placed into operation by suddenly closing the circuit of the +B source for both the oscillator and its associated rectifying system. When this is accomplished, a positive potential is impressed on auxiliary cathode 33 by current which flows through filter condenser 55 and initiates the flow of primary electrons. As the oscillations gradually build up in strength, the rectified voltage also builds up gradually, charging condenser 55 to higher and higher voltages until the oscillation reaches its ultimate strength.

In practical embodiments of the invention the desired high-frequency oscillations are attained by resonating winding 41 with natural capacitances, represented by condenser 39 as already explained. The vacuum tubes 30 and 60 of the rectifying systems may have characteristics similar to the commercial type 6L6 beam power tube and may be operated from a +B source of 300 volts to supply a unidirectional potential of 6,000 volts. To this end, the windings of the transformer 41, 42, 43 are proportioned to supply peak voltages, as follows, on the electrode systems of the tubes:

| Winding | Fig. 1 | Fig. 3 |
| --- | --- | --- |
| 41 | 6,000 | 6,000 |
| 42a | 225 | 240 |
| 42b | 450 | 450 |
| 43 (whole) | 90 | 450 |
| 43 (tap) | 45 | |

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A high-voltage power-supply system comprising: electron-discharge means including a first cathode for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; alternating-potential-supply means coupled in series relation between said auxiliary cathode and said output terminal; means coupled between said control electrode and said first cathode effective with said supply means at selected intervals to cause said primary electrons to flow from said first cathode to said auxiliary cathode only during intervals of low potential difference between said cathodes; and potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

2. A high-voltage power-supply system comprising: electron-discharge means including a first cathode for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; alternating-potential-supply means coupled in series relation between said auxiliary cathode and said output terminal; means coupled between said control electrode and said first cathode effective with said supply means to cause said primary electrons to flow from said first cathode to said auxiliary cathode only during intervals of low potential difference between said cathodes; and alternating-potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

3. A high-voltage power-supply system comprising: electron-discharge means including a first cathode maintained within a range of relatively low values relative to a reference potential for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; alternating-potential-supply means coupled in series relation between said auxiliary cathode and said output terminal; means coupled between said control electrode and said first cathode effective with said supply means to cause said primary electrons to flow from said first cathode to said auxiliary cathode only during intervals of low potential difference between said cathodes; and potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

4. A high-voltage power-supply system comprising: electron-discharge means including a first cathode maintained at approximately ground potential for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; alternating-potential-supply means coupled in series relation between said auxiliary cathode and said output terminal; means coupled between said control electrode and said first cathode effective with said supply means to cause said primary electrons to flow from said first cathode to said auxiliary cathode only during intervals of low potential difference between said cathodes; and potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

5. A high-voltage power-supply system comprising: electron-discharge means including a first cathode for emitting primary electrons, an auxiliary cathode for emitting secondary electrons by secondary emission in response to an electron bombardment from said first cathode, a control electrode, and an electron permeable collector electrode positioned between said cathodes and shielded by said control electrode from said first cathode for collecting secondary electrons emitted by said auxiliary cathode; at least one output terminal for said system; alternating-potential-supply means coupled in series relation between said auxiliary cathode and said output terminal; means coupled between said control electrode and said first cathode effective with said supply means to cause said primary electrons to flow from said first cathode to said auxiliary cathode only during intervals of low potential difference between said cathodes; and potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

6. A high-voltage power-supply system comprising: a single electron-discharge means including a first cathode for emitting primary electrons, an auxiliary cathode for emitting secondary electrons by secondary emission in response to an electron bombardment from said first cathode, a collector electrode for collecting secondary electrons emitted by said auxiliary cathode; and a control electrode; at least one output terminal for said system; alternating-potential-supply means coupled in series relation between said auxiliary cathode and said output terminal; means coupled between said control electrode and said first cathode effective with said supply means to cause said primary electrons to flow from said first cathode to said auxiliary cathode only during intervals of low potential difference between said cathodes; and alternating-potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal; said electron-discharge means comprising with said means coupled between said control electrode and said cathode and with said second-mentioned supply means a high-frequency oscillation generator.

7. A high-voltage power-supply system comprising: electron-discharge means including a first cathode for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; a first alternating-potential-supply means coupled in series relation between said auxiliary cathode and said output terminal; means coupled between said control electrode and said first cathode and including a second alternating-potential-supply means effective with said first supply means to cause said primary electrons to flow from said first cathode to said auxiliary cathode only during intervals of low potential difference between said cathodes; and a third potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

8. A high-voltage power-supply system comprising: electron-discharge means including a first cathode for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; a first alternating-potential-supply means having a predetermined operating frequency and coupled in series relation between said auxiliary cathode and said output terminal; means coupled between said control electrode and said first cathode and including a second alternating-potential supply means having said predetermined frequency and effective with said first supply means to cause said primary electrons to flow from said first cathode to said auxiliary cathode only during intervals of low potential difference between said cathodes; and a third potential-supply means having said predetermined frequency and coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

9. A high-voltage power-supply system comprising: electron-discharge means including a first cathode for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; a first alternating-potential-supply means coupled in series relation between said auxiliary cathode and said output terminal; biasing means and a second alternating-potential-supply means coupled in series relation between said control electrode and said first cathode and effective with said first supply means to cause said primary electrons to flow from said first cathode to said auxiliary cathode only during intervals of low potential difference between said cathodes; and a third potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

10. A high-voltage power-supply system comprising: electron-discharge means including a first cathode for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; a first high-frequency high alternating-potential-supply means coupled in series relation between said auxiliary cathode and said output terminal; means coupled between said control electrode and said first cathode and including a second high-frequency low alternating-potential-supply means effective with said first supply means to cause said primary electrons to flow from said first cathode to said auxiliary cathode only during intervals of low potential difference between said cathodes; and a third high-frequency alternating-potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive potential at said auxiliary cathode and said output terminal.

11. A high-voltage power-supply system comprising: electron-discharge means including a first cathode for emitting primary electrons, an auxiliary cathode for emitting secondary electrons by secondary emission in response to an electron bombardment from said first cathode, a collector electrode for collecting secondary electrons emitted by said auxiliary cathode, and a control electrode; at least one output terminal for said system; a first alternating-potential-supply means coupled in series relation between said auxiliary cathode and said output terminal; means coupled between said control electrode and said first cathode and including a second alternating-potential-supply means effective with said first supply means to cause said primary electrons to flow from said first cathode to said auxiliary cathode only during intervals of low potential difference between said cathodes; a third alternating-potential-supply means coupled between said collector electrode and said first cathode for applying to said collector electrode a potential more positive than that of said auxiliary cathode during operating intervals included within said intervals of primary electron flow, whereby said secondary electrons flow to said collector electrode from said auxiliary cathode and produce a high positive unidirectional potential at said auxiliary cathode and said output terminal for application to a load circuit; and means for suppressing from said unidirectional potential frequency components related to the potentials of said three potential-supply means.

ALAN HAZELTINE.

REFERENCES CITED

The following references are of record in the file of this patent:

UNITED STATES PATENTS

| Number | Name | Date |
|---|---|---|
| 937,971 | Thomas | Oct. 26, 1909 |
| 945,006 | Thomas | Dec. 28, 1909 |
| 1,230,004 | Meikle | June 12, 1917 |
| 2,284,389 | Hansen | May 26, 1942 |

FOREIGN PATENTS

| Number | Country | Date |
|---|---|---|
| 528,228 | Great Britain | Oct. 24, 1940 |

Certificate of Correction

Patent No. 2,513,936                                  July 4, 1950

ALAN HAZELTINE

It is hereby certified that error appears in the printed specification of the above numbered patent requiring correction as follows:

Column 2, line 55, after the word and period "terminal." insert the sentence *As used throughout the description and in the appended claims, the expression "secondary emission" is used to define electron emission from a solid material due directly to the impact of electrons on the material as distinguished from primary or thermionic emission in which electron emission is due directly to the temperature of the emitter.*; column 5, line 71, for the word "alternative" read *alternate*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*